Dec. 15, 1964  W. N. HOECK ETAL  3,161,840
TUNABLE CAVITY RESONATORS
Filed Aug. 29, 1962  3 Sheets-Sheet 1

INVENTORS
WILLIAM N. HOECK
JOHN J. RYAN
BY
*S.C. Yeaton*
ATTORNEY

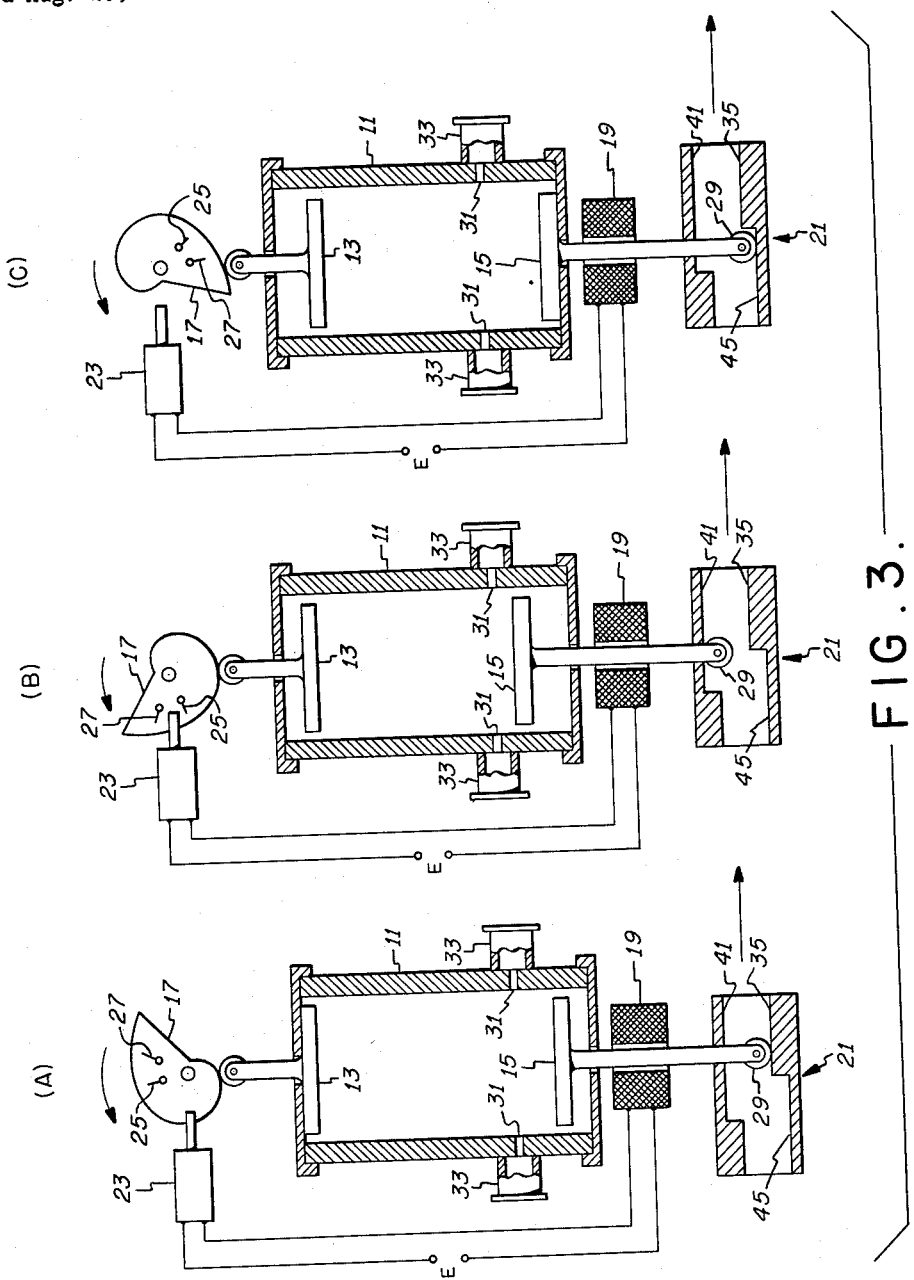

United States Patent Office 3,161,840
Patented Dec. 15, 1964

3,161,840
TUNABLE CAVITY RESONATORS
William N. Hoeck and John J. Ryan, Dunedin, Fla., assignors to Sperry Rand Corporation, Great Neck, N.Y., a corporation of Delaware
Filed Aug. 29, 1962, Ser. No. 220,244
10 Claims. (Cl. 333—83)

This invention relates to electrical resonators and more particularly to tunable cavity resonators.

Prior art tunable cavity resonators are operable only throughout limited bandwidths. Extraneous modes of oscillation impair the efficiency of these devices and restrict their operation to a small range of frequencies.

It is an object of the present invention to provide a tunable cavity resonator that is operable over wide bandwidths.

It is another object of the present invention to provide a tunable cavity resonator that has a high "Q" throughout the operating range.

It is still another object of the present invention to provide a tunable cavity resonator that is not adversely affected by extraneous modes of oscillation.

These and other objects are achieved in the present invention by providing a cavity in which the operation is automatically switched between a plurality of desired modes in order to circumvent the operating regions containing the troublesome extraneous modes.

Figure 1:
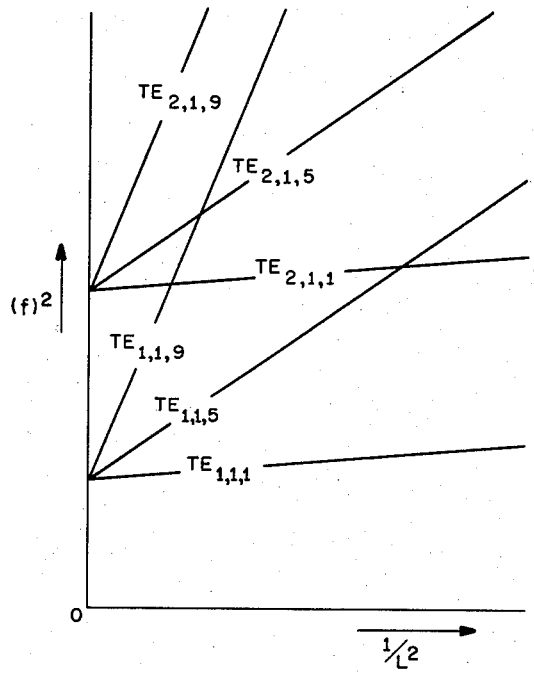
Figure 2:
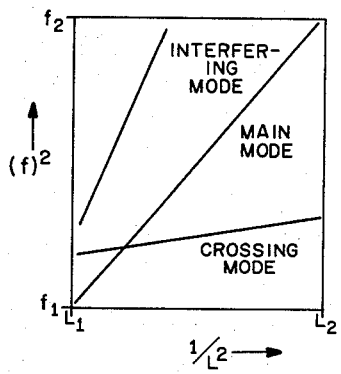
Figure 4:
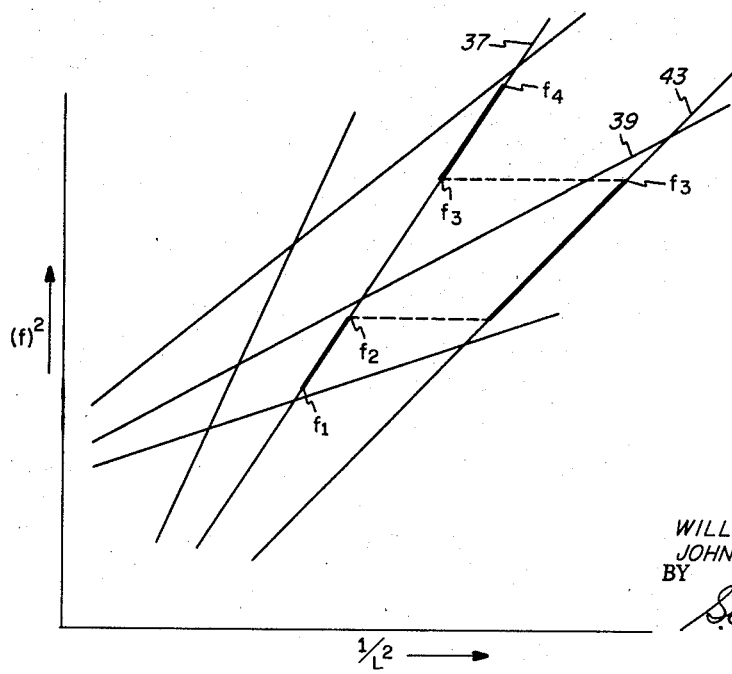
Figure 5:
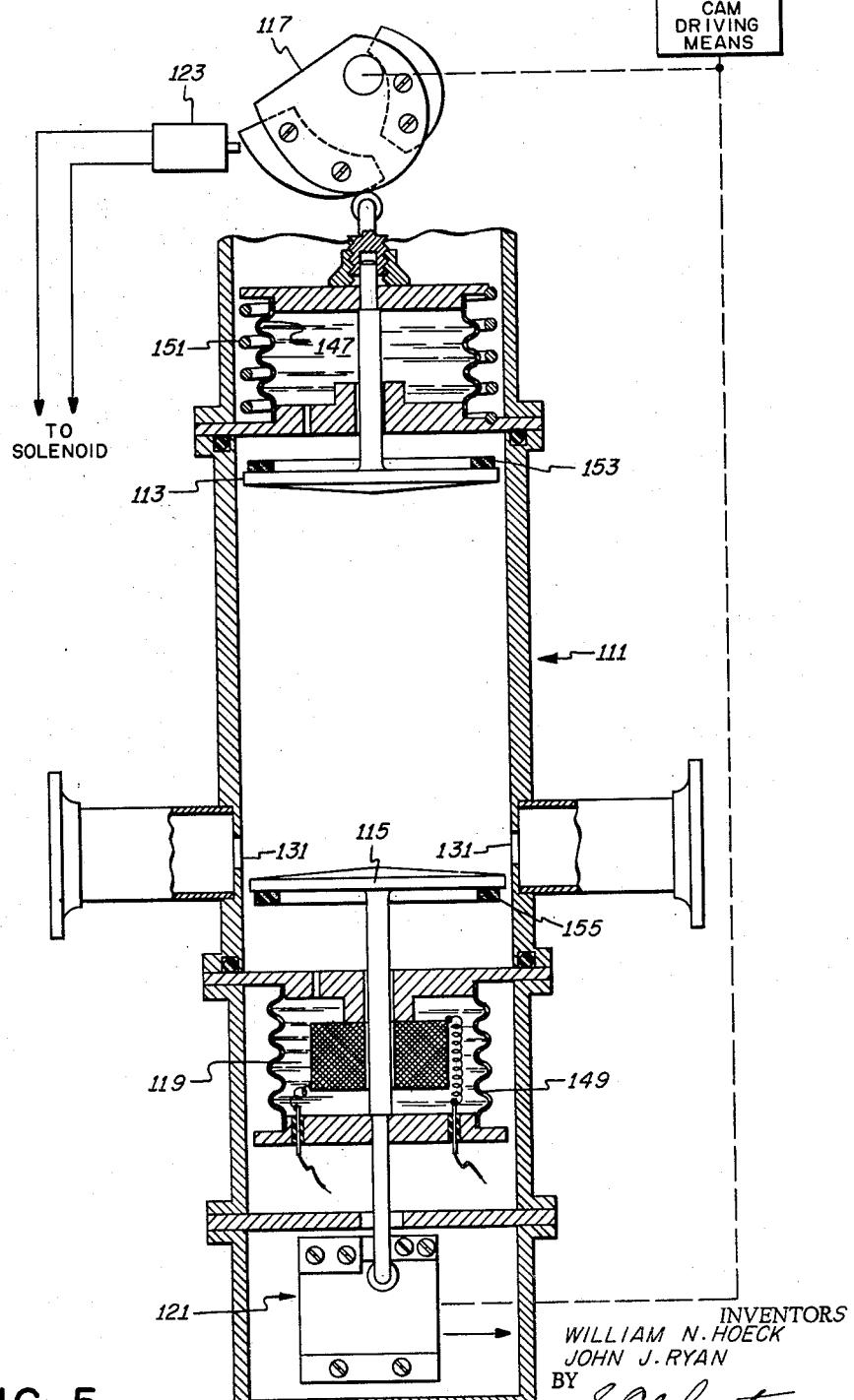

FIG. 1 is a graph depicting certain operating characteristics of cylindrical cavity resonators, FIG. 2 is a graph illustrating certain features of the graph of FIG. 1, FIG. 3 is a schematic diagram, partly in cross-section, of a tunable cavity constructed according to the principles of the present invention, FIG. 4 is a graph useful in explaining the operation of the invention, and FIG. 5 is a cross-sectional view of a typical resonant cavity employing the principles of the invention.

FIG. 1 represents a simplified mode plot for a cylindrical cavity resonator of a given diameter. As is well-known, by plotting the square of the frequency versus the reciprocal of the length squared for such a cavity, the various mode lines can be made to appear as straight lines. With such a graphical representation, the mode lines in each family radiate from a common intercept, and within any mode family the mode lines of successively higher numbers have correspondingly greater slopes. Only a few of the many possible mode lines have been indicated in FIG. 1 in order to simplify the diagram. The resonant frequency in any desired mode may be changed by varying the length of the cavity.

FIG. 2 represents an isolated section of a mode plot. Operation is intended to take place along the desired main mode line that forms the diagonal of the operating rectangle. Non-diagonal extraneous mode lines, however, also appear within the operating rectangle. The extraneous mode lines that do not intersect the main mode line represent interfering modes. These modes lead to ambiguity and confusion since they permit the cavity to be simultaneously resonant at more than one frequency. The effects of these modes, however, can usually be minimized by known mode suppression techniques such as those discussed in Patent No. 2,500,417 issued to J. P. Kinzer on March 14, 1950.

Those extraneous modes represented by mode lines that intersect the desired mode line within the operating rectangle are known as crossing modes. Except in the region close to the intersection, such modes act only to cause ambiguity. In the immediate region of the crossing point, however, the cavity is simultaneously resonant at the same frequency in both modes. Violent interaction may occur at such an intersection and degrade the efficiency of the cavity. For this reason, operation of the cavity is impractical in the region in which the mode lines intersect. Conventional cavities are limited in bandwidth since the operation must be confined to the region between two adjacent intersections.

FIG. 3 is a schematic diagram illustrating how the present invention can be used to obviate the interfering effects of the crossing modes.

A cylindrical cavity body 11 is fitted with a tuning plunger 13 and a stepping plunger 15. The tuning plunger is positioned by a cam actuating means 17. The stepping plunger 15 is drawn into the cavity by means of a solenoid 19. The travel of the stepping plunger is limited by a plunger stop 21.

The solenoid 19 is energized through a switch 23 which is actuated by the trigger means 25 and 27 on the cam 17. The switch 23 is conveniently of the bistable type in which successive input pulses alternately open and close the switch.

The plunger stop 21 contains several internal surfaces that can engage with the follower 29 on the stepping plunger 15. The plunger stop is laterally movable so that the various internal surfaces are available during the tuning cycle. The motion of the plunger stop can be synchronized with the motion of the cam 17 by a suitable linkage.

Conventional coupling means such as the irises 31 together with the waveguide sections 33 can be used to couple energy into and out of the cavity.

The operation of the invention can be better understood by referring to FIG. 4 together with FIG. 3.

Assume that the cavity is to be tuned throughout the frequency range from $f_1$ to $f_4$. The cavity 11 is first set in the condition shown in FIG. 3(a). The tuning plunger 13 is near the outward limit of its travel, the plunger stop 21 is positioned to the left, and the relay is deenergized. Plunger 15 falls back to an intermediate position as determined by the surface 35 of the plunger stop.

The cavity will resonate in the first desired mode represented by the mode line 37 at a frequency $f_1$. The cam 17 is rotated in a counterclockwise direction, forcing the tuning plunger inward and gradually raising the resonant frequency along the mode line 37. The frequency approaches the crossing mode represented by mode line 39, and when it reaches $f_2$, the trigger means 25 actuates the switch 23, thus energizing the solenoid 19. The plunger stop 21 is moved to a central position and the stepping plunger is pulled into its extended position as determined by the inner surface 41 of the plunger stop. The cavity is now in the condition shown in FIG. 3(b), and is resonant at the same frequency $f_2$, but in the adjacent mode represented by mode line 43. The frequency increases along the mode line 43 until it again approaches the crossing mode line 39. When the frequency $f_3$ is reached, the trigger means 27 again actuates the switch 23 thus breaking the circuit and deenergizing the solenoid 19. The plunger stop 21 is moved to the right so that the stepping plunger falls back to its fully retracted position determined by the surface 45. The cavity is now in the condition shown in FIG. 3(c) and is resonant at the same frequency $f_3$, but in the original mode represented by mode line 37. As the tuning plunger is moved still further inward, the frequency increases along the mode line 37 until the limiting frequency $f_4$ is reached.

The proper contour for the working surface of the cam 17 and the position of the various surfaces in the plunger stop 21 for a given application can be determined with the aid of a graph such as FIG. 4. Since the slopes of the individual mode lines differ from each other, the contour of the cam is usually designed to compensate for these differences so that the resonant frequency of the cavity changes at a suitable rate throughout the entire range of frequencies.

Since the tuning within the frequency range $f_1$ to $f_4$ is accomplished in such a way as to avoid crossing modes, the "Q" of the cavity remains high and substantially constant throughout this entire range.

A relatively simple mechanism has been described for achieving a broad tuning range utilizing three separate frequency bands of tuning and two adjacent modes of oscillation. It will be appreciated that the same process can be extended to more tuning bands or to more desired modes if necessary. The choice of desired modes depends upon the configuration of the extraneous modes in any particular design.

Although in its presently preferred form the tunable cavity is operated so that modes of adjacent number in the same family are used, the principles of the invention are not limited to such adjacent modes. Combinations of non-adjacent modes may be used if desired. Furthermore, it is not necessary that all the desired modes be in the same family.

Many variations of the structure shown in FIG. 3 will occur to those skilled in the art. Thus, for example, a single movable plunger may be used by combining the tuning means and stepping means so that the single movable plunger is actuated by both means.

In general, any tuning means, either electrical or mechanical, capable of switching the operation between various desired modes may be used in practicing the invention.

Energy can be coupled into and out of the cavity by conventional coaxial or waveguide means. The coupling means are preferably placed in regions wherein efficient coupling to each desired mode is available. Thus, for a waveguide system, coupling irises are preferably placed in a region in which the appropriate field maxima of the desired modes most nearly coincide, but in which the crossing mode maxima do not occur.

FIG. 5 is a cross-sectional view of a typical resonant cavity incorporating the principles of the invention. The cavity is designed to operate over a range of 5400 mc. to 5934 mc. in three tuning bands; 5400–5602 mc. in the $TE_{0,1,7}$ mode, 5602–5769 mc. in the $TE_{0,1,8}$ mode, and 5769–5934 mc. in the $TE_{0,1,7}$ mode.

The cavity body 111 is a right circular cylinder. A tuning plunger 113 and a stepping plunger 115 are actuated by a cam 117 and a solenoid 119 respectively. A plunger stop 121 serves to position the stepping plunger.

The working surface of the cam 117 is constructed in three segments, each corresponding to a given frequency band, so that a uniform tuning rate is available throughout the entire frequency range.

The solenoid is operated through a switch 123 which is actuated by the cam 117. The plunger stop 121 is driven laterally during the tuning cycle through the same driving means that is used to drive the cam.

The cavity of FIG. 5 is designed for pressurized operation. Conventional pressure seals are used in the waveguide flanges and the joints. The bellows 147 and 149 are used to seal the sliding joints associated with the plungers.

A coil spring 151 is used to urge the tuning plunger follower into intimate contact with the cam 117.

The coupling irises 131 are arranged diametrically opposite each other in a transverse plane.

The rings of absorbing material 153 and 155 attached to the underside of the plungers aid in suppressing extraneous modes of oscillation.

Approximate dimensions of the cavity are:

| | Inches |
|---|---|
| Inside diameter | 5.807 |
| Distance between plunger faces, lowest frequency | 8.604 |
| Distance between plunger faces, highest frequency | 7.761 |
| Stepping plunger travel, lowest frequency band to intermediate frequency band | 1.182 |
| Stepping plunger travel, intermediate frequency band to highest frequency band | 1.180 |
| Spacing, plane of coupling irises to stepping plunger face in lowest frequency position | 0.5 |

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A cavity resonator comprising a cylindrical cavity body, movable parallel end walls defining the boundaries of an enclosed electromagnetic field, means for moving one end wall to vary the tuning within a given band of frequencies, and means for moving the second end wall to shift the mode of oscillation without a change in frequency.

2. A cavity resonator comprising a cylindrical cavity body, movable plungers defining the boundaries of an enclosed electromagnetic field, means for moving one plunger to vary the tuning in a given mode within a selected band of frequencies, and means for moving the second plunger to shift the mode of oscillation without a change in frequency when the tuning approaches one limit of said band of frequencies.

3. A cavity resonator comprising a cylindrical cavity body, a tuning plunger longitudinally movable in said cavity, a stepping plunger longitudinally movable in said cavity, a cam for moving the tuning plunger to vary the tuning in a given mode within a selected band of frequencies, and means actuated by said cam for moving the stepping plunger to shift the mode of oscillation without a change in frequency when the resonant frequency of the cavity approaches one limit of said band of frequencies.

4. A cavity resonator comprising a cylindrical cavity body, a tuning plunger longitudinally movable in said cavity body, a stepping plunger longitudinally movable in said cavity, a cam for moving the tuning plunger in order to vary the tuning in a first desired mode within a selected band of frequencies, means actuated by the cam for shifting the position of the stepping plunger when the tuning reaches one limit of said band of frequencies, a plunger stop constructed and arranged to fix the positions of the stepping plunger so that the shifting of this plunger causes the cavity to resonate at the same frequency in a second desired mode of oscillation.

5. A cavity resonator comprising:
 (a) a cylindrical cavity body,
 (b) a tuning plunger longitudinally movable in said cavity body,
 (c) a stepping plunger longitudinally movable in said cavity body,
 (d) a cam for moving the tuning plunger to vary the tuning within selected bands of frequencies,
 (e) a solenoid for moving the stepping plunger in said cavity body,
 (f) a switch for controlling the flow of current through said solenoid, (g) trigger means arranged on the cam so as to actuate the switch when the tuning reaches the limit of a band of frequencies, (h) a plunger stop constructed and arranged to position the plunger so that the cavity remains resonant at the same frequency but in a second given mode when the switch is actuated.

6. A tunable cavity resonator of a type capable of supporting desired modes of electromagnetic oscillations and crossing modes of electromagnetic oscillations comprising:

(a) a cylindrical cavity body,
(b) a tuning plunger longitudinally movable in said cavity body,
(c) a stepping plunger longitudinally movable in said cavity body,
(d) a cam for moving the tuning plunger,
(e) a solenoid for moving the stepping plunger in the cavity body,
(f) a switch for controlling the current flow through said solenoid,
(g) trigger means arranged on the cam so as to actuate the switch when the spacing between the plungers approaches the value at which a crossing mode intersects the desired mode,
(h) a plunger stop constructed and arranged to limit the travel of the stepping plunger to a value that provides a shift to an adjacent desired mode of oscillation with no change in frequency.

7. A cavity resonator tunable over three adjoining frequency bands comprising:

(a) a right circular cylindrical cavity body,
(b) a tuning plunger in one end of said cavity body,
(c) a stepping plunger in the opposite end of said cavity body,
(d) a cam engaging the tuning plunger,
(e) first, second, and third segments on said cam dimensioned to move the tuning plunger throughout the range of positions corresponding to first, second, and third frequency bands respectively,
(f) a switch actuated by said cam, said switch being constructed and arranged to remain closed only when the tuning plunger is engaged by said second segment,
(g) a solenoid electrically connected to said switch and arranged to move the stepping plunger when the switch is closed, and
(h) a plunger stop to restrict the travel of the stepping plunger, said plunger stop being dimensioned to position the plunger for operation in a first desired mode when said solenoid is not energized, said plunger stop being further dimensioned to position the plunger for operation in a second desired mode when the solenoid is energized.

8. A cavity resonator tunable over three adjacent frequency bands comprising:

(a) a right circular cylindrical cavity body,
(b) a tuning plunger in one end of the cavity body,
(c) a stepping plunger in the opposite end of said cavity body,
(d) a cam engaging the tuning plunger,
(e) a solenoid to move the stepping plunger within the cavity body,
(f) a first segment on the surface of the cam constructed and arranged to move the tuning plunger through the range of positions necessary to tune the cavity throughout the first frequency band,
(g) a switch actuated by the cam,
(h) said switch being constructed and arranged to energize the solenoid when the first segment passes out of engagement with the tuning plunger,
(i) a plunger stop to limit the travel of the stepping plunger, said stop being dimensioned to position the stepping plunger so that the cavity resonates in a first desired mode when the solenoid is energized and in a second desired mode when the solenoid is deenergized,
(j) a second segment on the surface of the cam constructed and arranged to move the tuning plunger through the range of positions necessary to tune the cavity throughout the second band of frequencies,
(k) said switch being further constructed and arranged to deenergize the solenoid when the second segment passes out of engagement with the tuning plunger, and
(l) a third segment on the surface of the cam constructed and arranged to move the tuning plunger through the range of positions necessary to tune the cavity throughout the third band of frequencies.

9. A cavity resonator comprising a cavity body; movable parallel end walls defining two boundaries of an enclosed electromagnetic field, means for moving one end wall to vary the tuning within a given band of frequencies, means for moving the second end wall to shift the mode of oscillation without a change in frequency, and means to prevent relative angular displacement between the planes of the movable end walls.

10. A cavity resonator comprising a cavity body; a tuning plunger longitudinally movable in said cavity body; a stepping plunger longitudinally movable in said cavity; a cam for moving the tuning plunger in order to vary the tuning in a first desired mode of oscillation within a selected band of frequencies; means actuated by the cam for shifting the position of the stepping plunger when the tuning reaches one limit of said band of frequencies; a plunger stop constructed and arranged to fix the positions of the stepping plunger so that the shifting of this plunger causes the cavity to resonate at the same frequency in a second desired mode of oscillation; and coupling means in said cavity body position in a region in which an electromagnetic field maximum in the first desired mode most nearly coincides with an electromagnetic field maximum in the second desired mode.

References Cited in the file of this patent

UNITED STATES PATENTS

| | | |
|---|---|---|
| 2,471,419 | Edson et al. | May 31, 1949 |
| 2,500,417 | Kinzer | Mar. 14, 1950 |
| 2,573,148 | Kannenberg | Oct. 30, 1951 |